United States Patent [19]

Kimura et al.

[11] Patent Number: 4,628,756
[45] Date of Patent: Dec. 16, 1986

[54] POSITIONING APPARATUS

[75] Inventors: Shinjiro Kimura; Shigeru Toida, both of Ibaraki, Japan

[73] Assignee: Hitachi, Ltd., Tokyo, Japan

[21] Appl. No.: 727,568

[22] Filed: Apr. 26, 1985

[30] Foreign Application Priority Data

May 4, 1984 [JP] Japan .................................. 59-88284

[51] Int. Cl.⁴ ........................ G05G 11/00; F16C 29/06
[52] U.S. Cl. ....................................... 74/479; 108/143; 238/318; 248/657; 384/905; 403/28
[58] Field of Search ............................ 74/479; 108/143; 238/315, 318; 308/3 R, 6 C, DIG. 14; 350/531; 384/905; 248/657; 403/28, 30; 411/544

[56] References Cited

U.S. PATENT DOCUMENTS

| 2,104,299 | 1/1938 | Grundstein | 308/3 R |
| 2,672,378 | 3/1954 | McVey | 308/6 C |
| 3,429,506 | 2/1969 | Triplett | 238/349 X |
| 3,564,970 | 2/1971 | Larsen | 308/6 C X |
| 4,010,669 | 3/1977 | Kloren | 411/544 |
| 4,118,101 | 10/1978 | Teramachi | 308/6 C |
| 4,409,860 | 10/1983 | Moriyama et al. | 248/657 X |
| 4,492,356 | 1/1985 | Taniguchi et al. | 74/479 X |

FOREIGN PATENT DOCUMENTS 56-119351 9/1981 Japan .

Primary Examiner—Allan D. Herrmann
Attorney, Agent, or Firm—Antonelli, Terry & Wands

[57] ABSTRACT

A positioning apparatus for accurately positioning an object such as a work has a guide track secured to the associated frame by a plurality of tightening devices each having a tightening force adjusting member. The guide track is also pressed laterally against a vertical face portion formed on the associated frame by means of a plurality of pressing plates which are affixed to the frame by other tightening devices each having a pressing force adjusting member. Both the tightening devices securely holds the guide track on the frame while allowing relative movement therebetween caused by a difference in the amount of thermal expansion.

5 Claims, 5 Drawing Figures

POSITIONING APPARATUS

BACKGROUND OF THE INVENTION

The present invention relates to a multi-dimensional positioning apparatus having movable frames which are guided by linear guide tracks and, more particularly, to a positioning apparatus suitable for use in processes in which elimination of even small influence of thermal distorsion due to ambient temperature change is absolutely necessary, e.g., an automated assembly process for the assembly of electronic devices or apparatuses.

Positioning apparatuses of the above described type are designed in such a manner so as to exclude the use of materials having different values of thermal expansion coefficient, in order to avoid unfavorable influence of thermal distortion which may be caused by any change in the temperature, and to thereby ensure a high positioning accuracy. More specifically, major parts of the apparatus such as guide tracks and a movable frame are made of materials having similar values of thermal expansion coefficient, for instance iron and steel, and the guide tracks and other parts are directly fixed to the associated frames by bolts which also are made of a material such as steel or iron.

When the movable frame and bolts are made of material or materials similar to that of the guide tracks, however, the total weight of the apparatus is inconveniently increased. The increase in the weight of the movable parts seriously affects the positioning performance of the apparatus and often impairs the positioning accuracy. In addition, the driving system of the apparatus has to have a large power or capacity.

For eliminating the unfavorable effect of thermal distortion in a positioning apparatus, a method has been proposed in, for example, Japanese Patent Laid-Open No. 119351/1981, wherein compensation for any error in the positioning of a movable carriage is effected through the detection of the amount of change in the size of a ball screw shaft due to a temperature change, as well as the amount of deflection of the ball screw due to the weight of the movable carriage.

This proposed compensation method, however, requires a highly correct operation of the ball screw. Therefore, it is impossible to attain a high positioning accuracy, however correctly the error compensation may be conducted, if the ball screw fails to operate correctly due to a thermal distortion which may be caused by a difference in the value of friction coefficient between the ball screw and the movable carriage.

SUMMARY OF THE INVENTION

Accordingly, an object of the invention is to provide a positioning apparatus which affords a high positioning accuracy.

Another object of the invention is to provide a positioning apparatus having a reduced weight.

To these ends, according to the invention, a positioning apparatus is provided in which each guide track is secured to the associated frame by a plurality of tightening devices provided with tightening force adjusting members. At the same time, the guide tracks are pressed laterally against a vertical face portion formed on the associated frame by means of pressing plates which are affixed to the frame by means of other tightening devices provided with pressing force adjusting members. Both the tightening devices are so constructed as to permit relative movement between the frame and the guide track attributable to a difference in the amount of thermal expansion therebetween.

DETAILED DESCRIPTION

A preferred embodiment of the invention will be described hereinunder with reference to the accompanying drawings.

Figure 1:
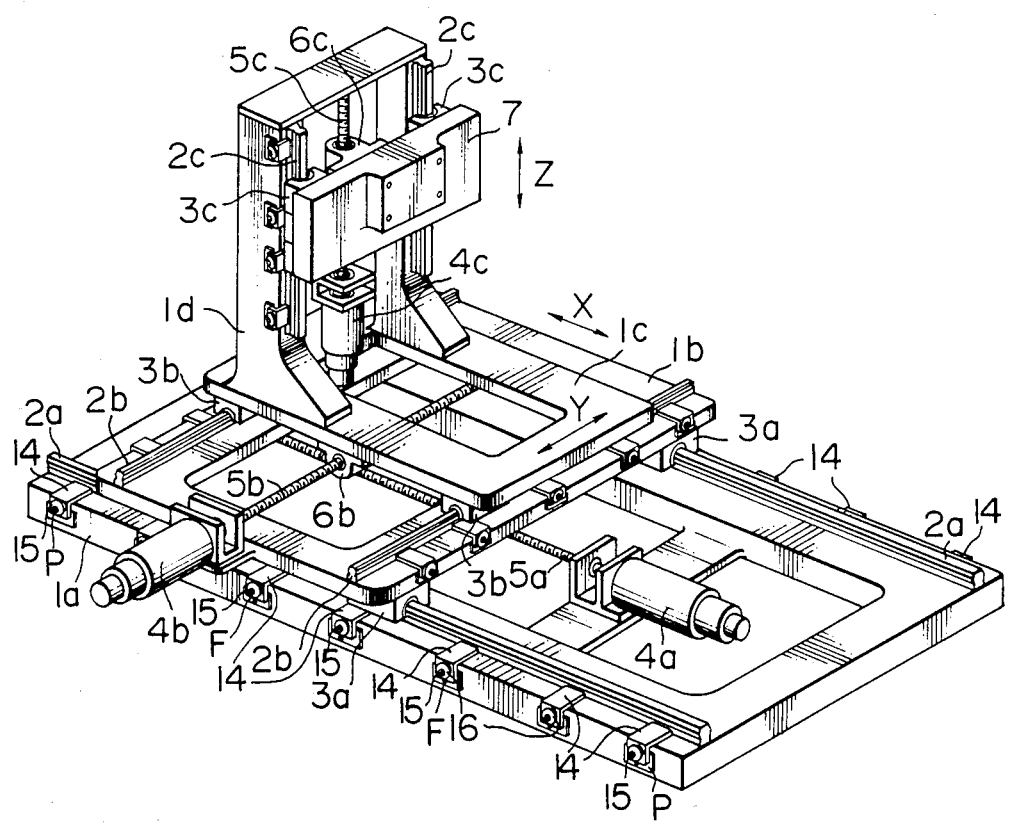
FIG. 1 is a perspective view of a positioning apparatus in accordance with the invention.

FIG. 1 shows a three-dimensional positioning apparatus in accordance with the invention, designed for positioning an object in three orthogonal directions: namely, in the X-axis direction, Y-axis direction and Z-axis direction as indicated by respective arrows X, Y and Z.

As shown in FIG. 1, the positioning apparatus of the present invention has a stationary frame 1a of a suitable material such as stainless steel, with pair of guide rails 2a,2a constituting a first guide track made of a bearing steel or a similar material, being provided on the upper surface of the frame 1a to extend on the opposite sides of the frame 1a in the longitudinal direction thereof. The stationary frame 1a includes a servomotor 4a and a ball screw 5a directly connected to the shaft of the motor, which are mounted on the frame intermediately between the guide rails 2a, 2a. A first movable frame 1b, of a stainless steel, is adapted to move in the X-axis direction along the first guide track by the driving of the servomotor 4a though a ball nut (not shown) provided on the lower side of the frame 1b and engaging with the screw 5a. The first movable frame 1b carries a pair of guide rails 2b,2b which constitute a second guide track, are also made of a bearing steel or a similar material and extend on the opposite sides of the frame 1b orthogonally to the first guide rails 2a,2a. The movable frame 1b is provided at its lower side with ball bearings 3a adapted for engagement with the first guide rails 2a,2a. The first movable frame 1b also carries a servomotor 4b having a motor shaft directly connected to a ball screw 5b.

A second movable frame 1c, of a stainless steel or a similar material, is adapted to be movable in the Y-axis direction along the second guide track, through engagement between ball bearings 3b secured to the lower side thereof and the second guide rails 2b,2b. The movable frame 1c is driven by the servomotor 4b though a ball nut 6b provided on the lower side of the frame 1c and engaging with the screw 5b. A vertical frame 1d is formed integrally with the second movable frame 1c such as to protrude vertically upwardly therefrom. The vertical frame 1d is provided on its opposite sides with a pair of guide rails 2c,2c constituting a third guide track. A work table mounting base 7, which has ball bearings 3c engaging with the third guide rails 2c,2c, is carried on the frame 1d to be movable up and down along the third guide track by the driving of a servomotor 4c through a ball screw 5c connected to the servomotor 4c. The base 7 is provided with a ball nut 6c adapted to be drivingly engaged by the screw 5c.

The linear guide rails 2a, 2a are secured to the stationary frame 1a by structures which will be more fully explained below.

Figure 2A:
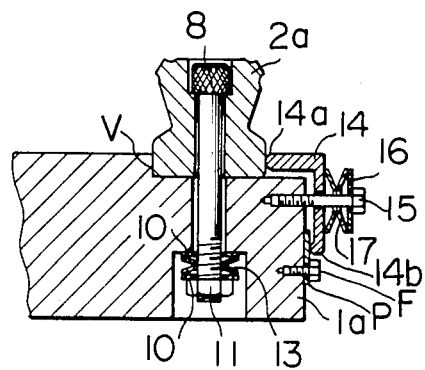
FIGS. 2A and 2B are a sectional side elevational view and a front elevational view, respectively, of an example of a structure for securing a linear guide track incorporated in the positioning apparatus of the invention.
Figure 2B:
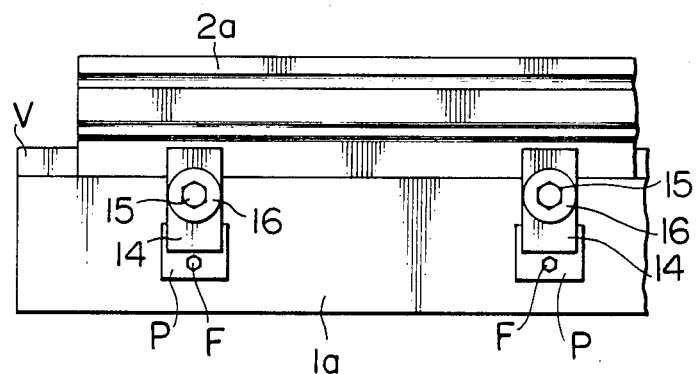

Referring now to FIGS. 2A and 2B, each of a plurality of tightening devices which secure each first guide rail 2a is composed of a tightening bolt 8, washers 10, nut 11 and disc springs 13 serving as a tightening force adjusting member. The devices are adapted to allow a relative movement between the stationary frame 1a and the guide rail 2a through the deflection of the disc springs 13. The guide rail 2a is pressed also laterally against a vertical face portion V formed on the frame 1a by a plurality of pressing plates 14 each of which is secured to a lateral side of the stationary frame 1a through a tightening device constituted by a tightening bolt 15, washer 16 and disc springs 17 serving as a pressing force adjusting member. One end 14a of the pressing plate 14 is pressed normally to the adjacent side of the guide rail 2a and the other end 14b is urged against a plate P secured to the frame 1a by fasteners F.

If the frames are made of a material lighter than the material of the guide rails, e.g., from aluminum by casting, it is possible to attain about 35% reduction in the total weight of the movable parts as compared with the case where the frames are made of the stainless steel or a similar material.

The guide rails 2b and 2c are secured to the movable frames 1b and 1d in the same manner as the fixing of the guide rail 2a to the stationary frame 1a.

According to the invention, since each guide track is secured to the associated frame by the tightening devices and pressing devices as described, they are pressed onto the frames at required constant tightening and pressing pressures by suitably adjusting the amount of deflection of the disc springs 13 in the tightening devices and that of the disc springs 17 in the pressing devices. The tightening force to be exerted by the tightening devices and the pressing force to be exerted by the pressing devices for correcting any error in the linearity of each guide rail with respect to the frame is on the order of several kilogrammes, which is much smaller than the rated tightening force of the bolts 8 and 15.

Any difference in the amount of thermal expansion strain between the guide track and the associated frame, which difference being attributable to the use of different materials, can be absorbed by a relative movement between the guide track and the frame afforded by the specific manner of fixing of the guide track explained hereinbefore. Consequently, any distortion or warp of the frame can be avoided without requiring any increase of the rigidity of the frame, so that the positioning of the object can be made highly accurately.

It is to be noted also that the required powers or capacities of the driving motors can be reduced if the weights of the movable parts such as movable frames are reduced by the use of a lighter material. This in turn affords a compact construction of the positioning apparatus as a whole through reduction in the sizes of the driving motors.

Figure 3A:
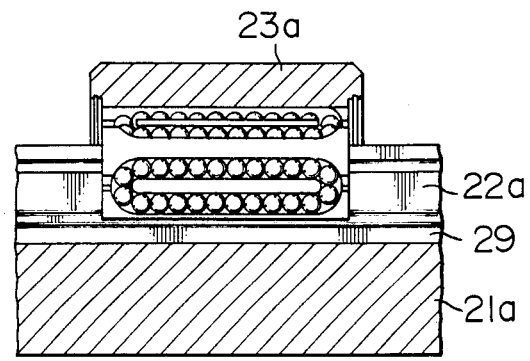
FIGS. 3A and 3B are a sectional side elevational view and a front elevational view, respectively, of an example of a structure for securing a linear track incorporated in a conventional positioning apparatus.
Figure 3B:
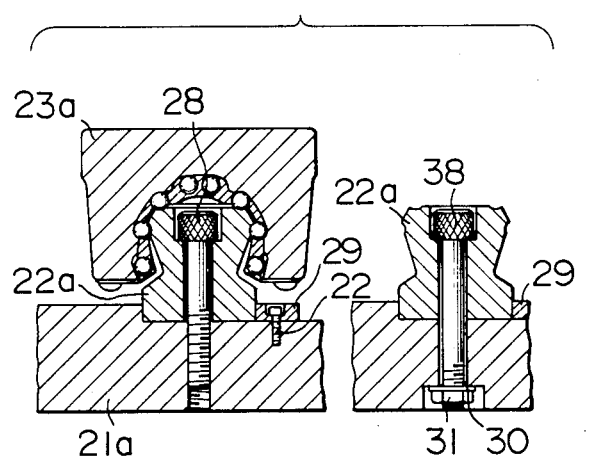

FIGS. 3A and 3B show a structure for securing a guide rail 22a to the stationary frame 21a of a conventional positioning apparatus. The guide rail 22a is secured to the frame 1a by a plurality of tightening bolts 28, or by a plurality of tightening devices each having a tightening bolt 38, washer 30 and a nut 31, and is laterally secured by a plurality of plates 29 which in turn are fixed to the frame 21a by means of small bolts 22. A ball bearing 23a is provided on the lower side of a movable frame of the apparatus.

In this conventional positioning apparatus, the parts such as the stationary frame 21a, pressing plates 29 and so forth are made of a ferrous material similar to that of the guide rail 22a, so that the weight of the positioning apparatus as a whole is increased inconveniently. The increased weight adversely affects the position control characteristics of the apparatus and makes it difficult to position the object quickly and accurately.

On the other hand, if a frame and a guide track are made of materials having different values of thermal expansion coefficient and fixed to each other only by bolts as in the case of the conventional arrangement shown in FIG. 3B, the frame and the guide track as a unit are warped as in the case of a bimetal due to a difference in the amount of thermal expansion when the temperature is changed. In order to avoid the warping, the frame supporting the guide track has to have an extremely large rigidity and, hence, a heavy weight.

On the other hand, in order that a slip or relative movement between a frame and a guide track fixed to each other only by bolts as in the case of the conventional arrangement shown in FIG. 3B occurs, the difference in the amount of thermal expansion between the frame and the guide track has to become large enough to overcome the product of the pressing force and the coefficient of friction. Consequently, each bolt has to sustain a large shearing stress. In order to avoid such a large shearing stress, it is necessary to estimate the friction coefficient and to suitably determine the pressing force in accordance with the thus estimated friction coefficient. The estimation of the friction coefficient, however, is extremely difficult because the friction coefficient is subject to various factors including the kinds of materials and the degrees of the surface roughness, particularly when the friction area is large. For this reason, it is quite difficult to allow a relative slip between the frame and the guide track.

In contrast, according to the invention, any difference in the amount of thermal expansion between a frame and a guide track attributable to the use of materials having different values of thermal coefficient is absorbed by the relative movement or slip between the frame and the guide track afforded by the specific structure for securing the guide track to the frame, so that the undesirable warping of the frame as a whole is prevented effectively without requiring substantial increase in the rigidity of the frame. This in turn ensures a high positioning accuracy.

What is claimed is:

1. An apparatus for accurately positioning a workpiece, the apparatus comprising: a stationary frame; at least one movable frame for carrying a workpiece to be positioned and to be movable on said stationary frame; driving means operatively connected to said movable frame for driving the latter; at least one guide track for guiding said movable frame, said guide track being secured to an associated frame by a plurality of tightening devices, each of said tightening devices is mounted through tightening force adjusting means so as to allow a relative movement between said guide track and associated frame in accordance with any difference in an amount of thermal expansion thereof.

2. A positioning apparatus according to claim 1, wherein said tightening force adjusting means comprise disc springs.

3. A positioning apparatus according to claim 1, wherein said guide track is made of a bearing steel.

4. A positioning apparatus according to claim 1, wherein said frames are made from cast aluminum.

5. An apparatus according to claim 1 further comprising pressing plate means for laterally pressing said guide track against a vertical face portion formed on the associated frame, said pressing plate means being mounted by a plurality of tightening devices through the tightening force adjusting means, so as to allow a relative movement between said guide track and associated frame in accordance with any difference in the amount of thermal expansion thereof.

* * * * *